United States Patent [19]

Barefoot

[11] 3,984,320
[45] Oct. 5, 1976

[54] VACUUM FILTER LEG FOR CLARIFYING VESSEL

[76] Inventor: Bernard B. Barefoot, R.D. No. 3 Sunset Drive, Export, Pa. 15632

[22] Filed: Nov. 21, 1975

[21] Appl. No.: 634,169

Related U.S. Application Data

[63] Continuation-in-part of Ser. No. 552,776, Feb. 24, 1975, Pat. No. 3,957,655.

[52] U.S. Cl. .............................. 210/139; 210/262; 210/295; 210/406; 210/533; 222/189; 141/44; 209/495
[51] Int. Cl.² .................. B01D 29/36; B01D 35/02
[58] Field of Search .......... 209/255, 258, 259, 490, 209/495; 210/113, 138, 139, 292, 262, 295, 297, 406, 407, 446, 448, 449, 447, 490, 519, 532, 533; 222/189; 141/5, 44, 45, 67, 68

[56] References Cited
UNITED STATES PATENTS

| | | | |
|---|---|---|---|
| 1,065,542 | 6/1913 | Main | 210/519 |
| 1,415,461 | 12/1920 | Lucas | 210/406 |
| 1,484,505 | 2/1924 | Kiefer | 210/406 |
| 3,260,285 | 7/1966 | Vogt | 141/67 |
| 3,291,569 | 12/1960 | Rossi | 210/262 |
| 3,379,477 | 4/1968 | Beckmeyer | 209/259 |
| 3,580,419 | 5/1971 | Carter | 222/189 |
| 3,616,925 | 11/1971 | Tolman | 210/534 |
| 3,720,241 | 3/1973 | Bryant | 222/189 |
| 3,777,887 | 12/1973 | Johnston | 210/490 |
| 3,825,119 | 7/1974 | Rost | 210/139 |
| 3,957,655 | 5/1976 | Barefoot | 210/512 |

*Primary Examiner*—Thomas G. Wyse
*Assistant Examiner*—Ernest G. Therkorn
*Attorney, Agent, or Firm*—William J. Ruano

[57] ABSTRACT

An apparatus and a control system for receiving the mud-like discharge from a liquid clarifying vessel and dewatering it into the form of slugs by vacuum means connected to the annular space surrounding a stand pipe connected to the discharge outlet. A timing and control system effects squeeze-out action and discharges the dewatered slugs from a flapper valve on a timed basis, as well as effecting periodic clean-out action.

7 Claims, 4 Drawing Figures

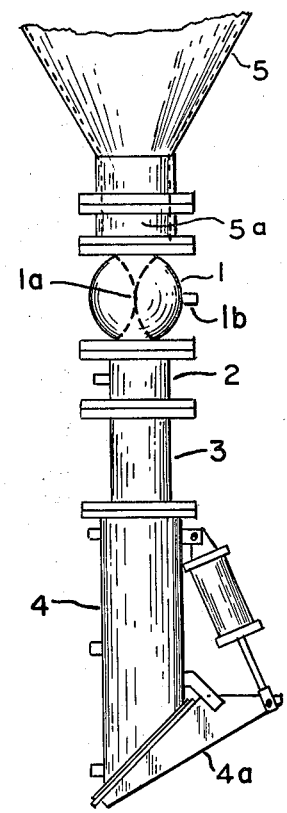
FIG. I
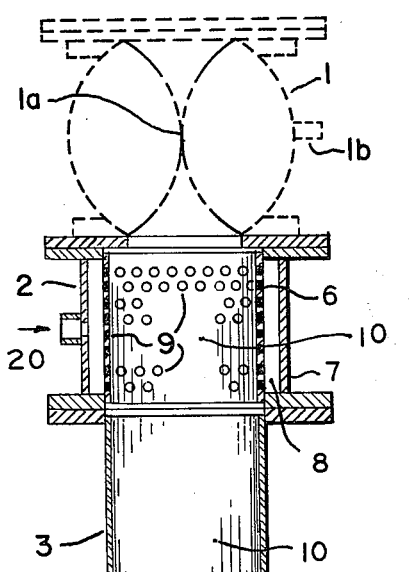
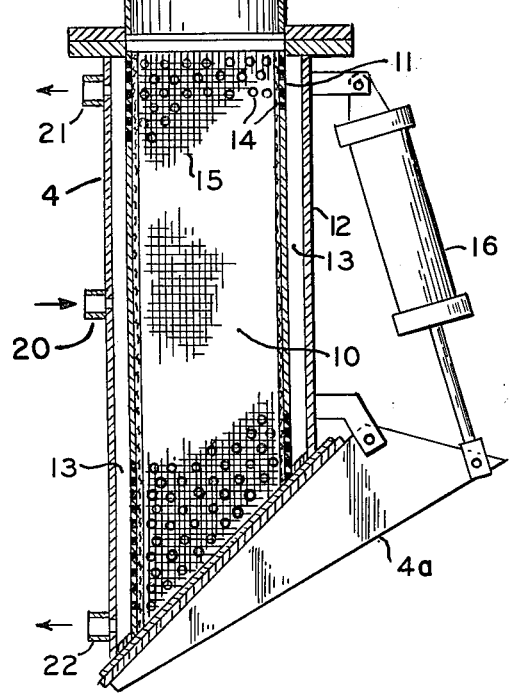
FIG. 2

VACUUM FILTER LEG FOR CLARIFYING VESSEL

This application is a continuation-in-part of my application Ser. No. 552,776, filed Feb. 24, 1975, now U.S. Pat. No. 3,957,655, and relates more particularly to a vacuum filter leg for de-watering the slugs or pellets discharged from a sphincter cone or other clarifying vessel for purifying water or other liquid.

Liquid (water) clarifiers are utilized to separate or dewater the pulps and solids, either to reclaim the solution for recirculation or to lower the moisture content of the pulps or solids of slurry, or for both reasons.

An outstanding disadvantage is that the collected pulps or solids of slurry, as discharged from most clarifiers, are quite high in moisture content and generally too high for transportation by rubber belt conveyors. The collected solids or pulps usually have no resistance to slumps and require considerable clean up in the work area due to spillage where solids are collected by the clarifier. Most pulps and solids that are collected by a clarifier are either conveyed to a vacuum drum or disc filter for de-watering in a pipe or hauled away in leak-proof buckets to the disposal area.

An object of the present invention is to overcome the abovementioned disadvantages and to provide a novel device for de-watering the collected pulp or solids in any device used as a means for separating the liquids or de-watering pulps or solids such as, but not limited to, such devices as water clarifiers by the following means and as hereafter described:

Other objects and advantages will become more apparent from a study of the following description taken with the accompanying drawing wherein:

FIG. 1 is an elevational view of a vacuum filter leg embodying the principles of the present invention;

FIG. 2 is an enlarged, vertical, cross-sectional view thereof; and,

Figure 3:
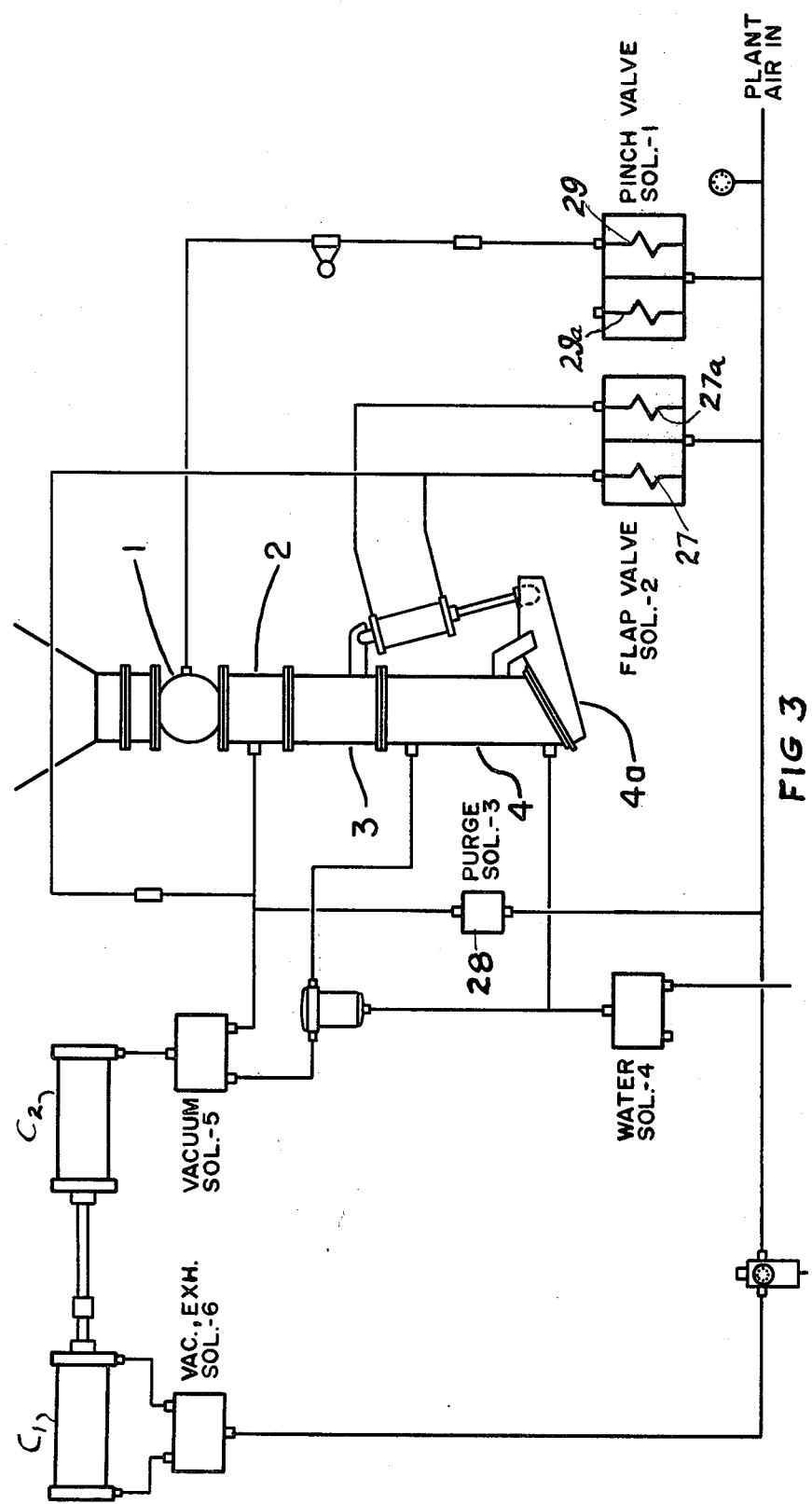
FIGS. 3 and 4 show an electrical pneumatic control system for automatically performing various operations on the vacuum filter leg on a timed basis.

Reference is now made to FIGS. 1 and 2 of the drawing. A power operated isolating valve, such as a pinch valve 1, is installed beneath the solids or pulp discharge outlet 5a of the de-watering vessel 5 to isolate and/or seal off the vessel flow of pulp or solids from the vessel 5. An example of such de-watering vessel is shown and described in my aforesaid prior patent application.

An isolating or pinch valve 1 has a metal housing enclosing a hose-like rubber tube or valve element 1a which, when collapsed by the introduction of air under pressure into inlet 1b, will collapse tube 1a and thereby close the valve, simulating the pinching of a water hose sufficiently to stop flow therethrough. Of course, upon release of a part or all such air under pressure, the valve may be either partially opened, for throttling, or completely opened. The valve may be modified by substituting a power operated butterfly valve and operated similar to the pinch valve.

An outstanding advantage in the use of such pinch valve is that any solid particles in the discharged slurry that may be entrapped by closing of the valve will not interfere with an air-tight closure possibility since the tubular valve element, being of flexible rubber, molds itself around the particles.

Another advantage is the wringing effect of the valve upon closure which reduces the actual volume in the lower portion of the valve, that is, below the pinched or closed part, so as to aid in squeezing out liquid entrained in the trapped material in space 10.

Beneath this isolating or seal-off or pinch valve 1, a section of leg or stand pipe 2 is installed having an inner and an outside cylindrical wall, 6 and 7, respectively, with an air chamber 8 between the two cylindrical walls. A plurality of perforations or holes 9 are provided at the bottom and through the inner wall 6, surrounded by the outside wall 7. Directly beneath this section 2, another stand pipe 3 is furnished, having a tapered or straight wall section for cavity 10.

Beneath the section 3, another separate section 4 of stand pipe is also furnished having a tapered or straight perforated cylindrical wall 11 and an outer cylindrical wall 12 with an air chamber space 13 between the inner wall and the outer wall. In the bottom section of this two cylinder stand pipe, inner cylinder wall 11 has a section where perforations or holes 14 are made to provide a free opening into the air chamber space 13, between the two cylinders. The inside circumference also has mesh 15 or filter media placed over the perforations or holes 14 and a cage to hold the filter media.

Fitted on the bottom end of this two cylinder section 4 is a power-operated flap valve 4a, that opens and closes and provides an air seal to atmosphere.

The vacuum filter leg of the present invention operates as follows: The slurry of pulp or solids is passed from the vessel 5 through the vessel outlet 5a and through the open isolating valve or pinch valve 1, through the upper stand pipe section 2, and into the lower stand pipe sections 3 and 4, the latter having a shut-off valve 4a shown in the closed position. After the slurry of pulp or solids has completely filled the inside cylinder filter leg 10, the isolating valve or pinch valve 1 is closed by introducing air under pressure in inlet 1b. Compressed air can be introduced into section 2 through inlet 20 and into the cavity 10 to provide further wringing or squeezing-out- liquid action in the trapped material in the stand pipe on a cycle timed basis.

An air vacuum is then made in the air chamber space 13 of stand pipe section 4 by exhausting air through pipe 21 to extract the entrained water from the pulp or solids by allowing make-up air introduced in pipe 20 to be passed into a space 8 at the top, thence through perforations 9 in the upper stand pipe section 2 and down through filter leg 10 in the lower stand pipe section 3. As stated previously, the vacuum is drawn from the lower stand pipe section through pipe 21. The water that is not entrained in the evacuated air is drained by gravity from the bottom of air chamber space 13 near the bottom through a drain pipe 22 which serves as a seal or as a barometric leg and is also provided with an automatic shut-off valve (not shown) to hold the evacuated water from the slurry of pulp or solids.

Thus the slurry in the entirety of the center cavity 10 is dewatered and formed into a slug or pellet which is ultimately discharged by opening flap valve 4a. Such discharge may be done manually by operation of various control valves, but it is preferably done on an automatic time basis. The automatic timing means described in the above-entitled parent application may be used.

Figure 4:
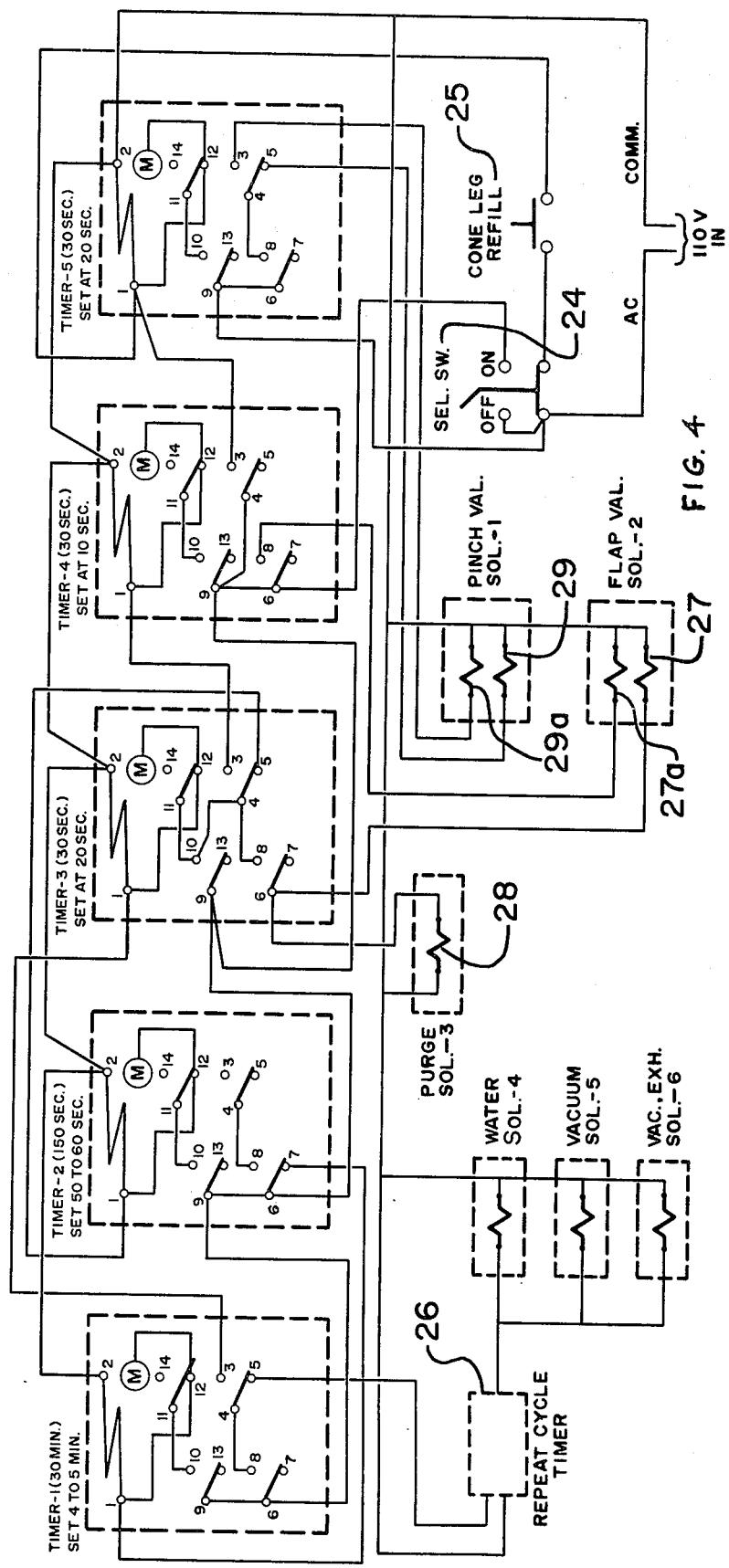

FIGS. 3 and 4, however, show a more sophisticated and completely automatic timing and purging system for the apparatus shown in FIGS. 1 and 2.

FIGS. 3 and 4 show a pneumatic electrical control system for the vacuum filter leg shown in FIGS. 1 and 2. The operation of the vacuum filter leg is accomplished automatically by means of present adjustable electrical timers to electrically energize a compressed air system of solenoid valves to perform all the following described sequences of opening and closing the valves (pinch valve or butterfly valve and flap valve), start and stop the vacuum system, relieve the vacuum system, purge the air chamber space, clean the filter media surface with compressed air, drain the evacuated water away for disposal from the vacuum leg and reset the timers to repeat automatically the above described sequences.

The present timers are energized electrically. When power is off to the timers, all timers are at the starting point of time and all valves are closed.

Before turning selector switch 24 to the "on" position, it is necessary to push the "open isolating valve" or "open pinch valve" push button 25 to fill up the cone leg with solids or pulp. That push button energizes timer 5 to perform that function. When timer 5 de-energizes, the selector switch 24 is turned to the "on" position. When the selector switch is in the "on" position, it will start timer 1. When timer 1 is started, it will start a repeat cam timer. The repeat cam timer 26 will energize and de-energize a series of solenoids to pull a vacuum and exhaust the vacuum in the cone leg, by means of reciprocating air cylinders C1, C2, tied together or with a vacuum pump.

When Timer 1 times out, it will break the 110 volts from the repeat cycle Timer 26 and the timer will stop. At that time when the power is off, the vacuum in the cone leg will be relieved automatically. When Timer 1 times out it will send an electrical impulse to Timer 3 to start it. When Timer 3 is started, it will energize two solenoids and start Timer 2. One solenoid 27 will open the flap valve 4a to let the solids be discharged, and the other solenoid 28 will open to purge into the cone leg to clean the filter media 15.

When Timer 3 times out, it will send an electrical impulse to Timer 4 to start it. When Timer 4 is started, it will energize one solenoid 27a to close the flap valve 4a.

When Timer 4 times out, it will send an electrical impulse to Timer 5 to start it. When Timer 5 starts it will energize a solenoid 29 to open the pinch valve 1 to let the solids or pulp flow in and fill up the cone leg. When Timer 5 times out, it will energize a solenoid 29a to close the pinch valve. A few seconds after Timer 5 times out, Timer 2 will time out and will send an electrical impulse to Timer 1 to start the cycle all over again.

Thus it will be seen that I have provided a highly efficient vacuum leg for de-watering the slurry discharged from a liquid purifying vessel and to form substantially solid slugs or pellets before discharging from a shut-off valve, whereby such slugs may be more easily handled, transported and used; also, I have provided a control system therefor to relieve the vacuum system, purge the air chamber space, clean the filter media surface with compressed air, drain the evacuated water away for disposal, reset timers and automatically repeat predetermined sequences.

While I have illustrated and described a single specific embodiment of my invention, it will be understood that this is by way of illustration only and that various changes and modifications may be contemplated in my invention and within the scope of the following claims.

I claim:

1. In combination with an outlet at the bottom of a liquid clarifying vessel, a valve having one end connected to said outlet, a stand pipe connected to the other end of said valve, said stand pipe having perforated inner wall portions and having outer cylinder wall portions spaced from and surrounding said stand pipe inner wall portions to provide annular air space means, said perforated portions are separated by a solid cylindrical wall so as to provide separate upper and lower annular air spaces, means for introducing air under pressure in said upper annular air space to effect squeezing out of liquid from the interior of said stand pipe, a shut-off discharge valve connected to the bottom of said stand pipe, and means for evacuating said annular air space means to dewater the contents of said stand pipe when said first mentioned valve and shut-off discharge valve are closed.

2. Apparatus as recited in claim 1 wherein said first mentioned valve is a rubber hose-like pinch valve surrounded by a chamber to form a space therebetween in which air under pressure is introduced to collapse and close said pinch valve and wherein said shut-off discharge valve is a flap valve.

3. Apparatus as recited in claim 2 together with timing means for controlling, on a timed basis, the operations of said means for evacuating said annular air space means so as to discharge dewatered slugs from said flap valve on a timed basis.

4. Apparatus as recited in claim 3 wherein said timing means includes solenoid energizing means sequentially opening said pinch valve to allow solids or pulp from said vessel to flow to fill up said stand pipe portions and, after a predetermined time, close said pinch valve, and air cylinder means for thereafter exhausting air from said annular air space means to create a vacuum therein, said timing means, after a predetermined period of time, opening said flap valve to allow solid pellets to be discharged, and after another period of time, purging said stand pipe portions with water to clean them, thereafter closing said flap valve, and finally repeating said entire sequence of operations.

5. Apparatus as recited in claim 1 together with a filter closely surrounded by the lowermost perforated inner cylindrical wall portion.

6. Apparatus as recited in claim 1 wherein said means for evacuating said annular air space means is an evacuating pump connected to said lower annular air space.

7. Apparatus and a control system as recited in claim 1 including control means for periodically purging said annular air space means and cleaning said perforated portions with fluid under pressure.

* * * * *